United States Patent
Kim et al.

(10) Patent No.: US 7,958,410 B2
(45) Date of Patent: Jun. 7, 2011

(54) METHOD FOR SHIFTING A PHASE OF A CLOCK SIGNAL AND MEMORY CHIP USING THE SAME

(75) Inventors: Sang-yun Kim, Yongin-si (KR); Young-don Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 218 days.

(21) Appl. No.: 12/216,779

(22) Filed: Jul. 10, 2008

(65) Prior Publication Data
US 2009/0016476 A1    Jan. 15, 2009

(30) Foreign Application Priority Data
Jul. 11, 2007 (KR) .................. 10-2007-0069837

(51) Int. Cl.
*G11C 29/00* (2006.01)
(52) U.S. Cl. ......................................... 714/718
(58) Field of Classification Search .................. None
See application file for complete search history.

(56) References Cited

U.S. PATENT DOCUMENTS

| | | | | |
|---|---|---|---|---|
| 4,301,466 A * | 11/1981 | Lemoine et al. | ............ | 348/539 |
| 6,182,236 B1 * | 1/2001 | Culley et al. | .............. | 713/503 |
| 6,374,360 B1 * | 4/2002 | Keeth et al. | ............... | 713/400 |
| 6,701,140 B1 * | 3/2004 | Stine | ............................ | 455/260 |
| 6,735,543 B2 * | 5/2004 | Douskey et al. | ............. | 702/120 |
| 7,143,303 B2 | 11/2006 | Sohn et al. | | |
| 7,414,933 B2 * | 8/2008 | Tonami | ..................... | 369/47.35 |
| 7,529,329 B2 * | 5/2009 | Popescu et al. | ............... | 375/354 |
| 7,664,978 B2 * | 2/2010 | Burney et al. | ................. | 713/500 |
| 2003/0031282 A1 * | 2/2003 | McCormack et al. | ........ | 375/355 |
| 2004/0258183 A1 * | 12/2004 | Popescu et al. | ............. | 375/350 |
| 2005/0265064 A1 | 12/2005 | Ku et al. | | |
| 2006/0253746 A1 * | 11/2006 | Momtaz | ........................ | 714/704 |
| 2008/0075156 A1 * | 3/2008 | Schumacher et al. | ........ | 375/226 |
| 2008/0104456 A1 * | 5/2008 | Talbot | ........................... | 714/704 |
| 2009/0103572 A1 * | 4/2009 | Zerbe | ........................... | 370/503 |
| 2010/0058100 A1 * | 3/2010 | Best et al. | ..................... | 713/401 |

FOREIGN PATENT DOCUMENTS

| KR | 10-2005-0020359 A | 3/2005 |
|---|---|---|
| KR | 10-2006-0135290 A | 12/2006 |

* cited by examiner

*Primary Examiner* — Robert Beausoliel
*Assistant Examiner* — Guerrier Merant
(74) *Attorney, Agent, or Firm* — Lee & Morse, P.C.

(57) ABSTRACT

A memory chip includes a receiver, a clock phase shifter, an error detector, and a controller. The receiver receives a test signal having a plurality of random data bits. The clock phase shifter shifts the phase of a clock signal to one of first through nth phases (n is a natural number). The controller controls the clock phase shifter to sequentially increase the phase of the clock signal from the first phase when the error detector determines the data bit sampled in synchronization with the clock signal has an erro has an error. The controller controls the clock phase shifter to sequentially decrease the phase of the clock signal from the nth phase when none of the plurality of data bits sampled in synchronization with the clock signal having a kth phase (k is a natural number greater than 1 and smaller than n−1) have an error.

19 Claims, 9 Drawing Sheets

METHOD FOR SHIFTING A PHASE OF A CLOCK SIGNAL AND MEMORY CHIP USING THE SAME

BACKGROUND OF THE INVENTION

1. Field of the Invention

Embodiments relate to a memory chip. More particularly, embodiments relate to a method for shifting the phase of a clock signal and a memory chip using the same.

2. Description of the Related Art

Semiconductor memory devices transmit and receive data in response to a clock signal. That is, semiconductor memory devices sample data in synchronization with a rising edge or a falling edge of a clock signal.

To transmit and receive the data between the transmitter and the receiver, the clock signal must be correctly synchronized with the data. When pulses of the clock signal are not exactly synchronized with edges of the waveform of data bits transmitted and received, the probability that an error is generated in the data bits increases. Accordingly, it is preferable that the pulses of the clock signal are synchronized with middle points of periods in which the data bits are sampled without error. Therefore, semiconductor memory devices perform an operation of detecting middle points of periods in which data bits are sampled without error as an initial operation.

FIG. 1 illustrates data DATA and a clock signal CLK in a conventional clock phase shifting method. Referring to FIG. 1, the conventional method determines whether the data DATA sampled in synchronization with the clock signal CLK has an error while shifting the phase of the clock signal CLK. For the particular example in FIG. 1, data DATA is one bit data, the clock signal CLK has a cycle of 360°, and the phase of the clock signal CLK is shifted by 10°.

An edge of a pulse of the clock signal CLK is synchronized with an edge of the waveform of the data bit DATA. When the clock signal CLK has a phase of 0°, the data bit DATA sampled in synchronization with the clock signal CLK having a phase of 0° has an error (F) if the clock signal CLK is synchronized with the left edge of the waveform of the data bit DATA. Then, the phase of the clock signal CLK is shifted by 10° and the data bit DATA is sampled in synchronization with the clock signal CLK having a phase of 10°. In this case, the sampled data bit DATA also has an error (F). In this manner, the data bit DATA is sampled while the phase of the clock signal CLK is shifted by 10° to determine whether the data bit DATA has an error. In FIG. 1, the data bit DATA has an error (F) when sampled in synchronization with the clock signal CLK having phases of 0°, 10°, 20° and 30° and does not have an error (P) when sampled in synchronization with the clock signal CLK having phases of 40°, 50°, . . . , 340°. Furthermore, the data bit DATA has an error (F) when sampled in synchronization with the clock signal CLK having phases of 350° and 360°.

As described above, the conventional method determines whether each data bit has an error for every phase of a clock signal while the phase of the clock signal is shifted. However, the conventional method requires an excessively long period of time to determine whether data has an error.

SUMMARY OF THE INVENTION

Embodiments are therefore directed to a method for shifting the phase of a clock signal and a memory chip using the same, which substantially overcome one or more of the disadvantages of the related art.

It is a feature of an embodiment to provide a memory chip capable of rapidly detecting a middle point of a period in which every data bit is sampled without error in an initial operation of a semiconductor memory device.

It is another feature of an embodiment to provide a method for shifting the phase of a clock signal so as to rapidly detect a middle point of a period in which every data bit is sampled without error in an initial operation of a semiconductor memory device.

At least one of the above and other features and advantages may be realized by providing a memory chip including a receiver, a clock phase shifter, an error detector, and a controller. The receiver receives a test signal having a plurality of random data bits. The clock phase shifter shifts the phase of a clock signal to one of first through nth phases (n is a natural number). The error detector determines whether the data bits sampled in synchronization with the clock signal have an error. The controller controls the clock phase shifter to sequentially shift the phase of the clock signal from the first phase in response to the determination result of the error detector and controls the clock phase shifter to sequentially shift the phase of the clock signal from the nth phase when none of the data bits sampled in synchronization with the clock signal having a kth phase (k is a natural number greater than 1 and smaller than n−1) have an error.

The controller may control the clock phase shifter to shift the phase of the clock signal to an (i+1)th phase (i is a natural number greater than 1 and smaller than k−1) when an error is initially generated in the data bits sampled in synchronization with the clock signal having an ith phase.

The controller may control the clock phase shifter to shift the phase of the clock signal to an (m−1)th phase (m is a natural number greater than k+1 and smaller than n) when an error is initially generated in the data bits sampled in synchronization with the clock signal having an mth phase.

The memory chip may further include a temporary register storing a first code corresponding to the kth phase and storing a second code corresponding to a jth phase of the clock signal when none of the data bits sampled in synchronization with the jth clock signal have an error.

The memory chip may further include an initial value setting unit setting the intermediate value of the first code and the second code as an initial sampling code value of the clock signal.

The memory chip may further include a counter counts a data bit that is sampled in synchronization with the clock signal having the sequentially shifted phase and has no error.

At least one of the above and other features and advantages may be realized by providing a receiver, a clock phase shifter, an error detector, and a controller. The receiver receives a test signal having a plurality of random data bits. The clock phase shifter shifts the phase of a clock signal to one of first through nth phases (n is a natural number). The error detector determines whether the data bits sampled in synchronization with the clock signal have an error. The controller controls the clock phase shifter to sequentially shift the phase of the clock signal from the nth phase in response to the determination result of the error detector and controls the clock phase shifter to sequentially shift the phase of the clock signal from the first phase when none of the data bits sampled in synchronization with the clock signal having a jth phase (j is a natural number greater than 2 and smaller than n) have an error.

At least one of the above and other features and advantages may be realized by providing a method for shifting the phase of a clock signal, the method including determining whether data bits sampled in synchronization with a clock signal sequentially shifted from a first phase to an nth phase (n is a natural number) have an error, shifting the phase of the clock signal to an (i+1)th phase (i is a natural number greater than 1 and smaller than n−1) and determining whether the data bits have an error when an initial error is generated in the data bits sampled in synchronization with the clock signal having an ith phase, shifting the phase of the clock signal to the nth phase when the none data bits sampled in synchronization with the clock signal having the ith phase have an error, determining whether the data bits sampled in synchronization with the clock signal sequentially shifted from the nth phase have an error, and shifting the phase of the clock signal to an (m−1)th phase (m is a natural number greater than 2 and smaller than n) and determining whether the data bits have an error when an initial error is generated in the data bits sampled in synchronization with the clock signal having an mth phase.

The method may further include storing a first code corresponding to the ith phase when none of the data bits sampled in synchronization with the clock signal having the ith phase have an error, and storing a second code corresponding to the mth phase when the none of data bits sampled in synchronization with the clock signal having the mth phase have an error.

The method may further include setting the intermediate value of the first code and the second code as an initial sampling code value of the clock signal.

BRIEF DESCRIPTION OF THE DRAWINGS

The above and other features and advantages will become more apparent to those of ordinary skill in the art by describing in detail exemplary embodiments thereof with reference to the attached drawings, in which.

DETAILED DESCRIPTION OF THE INVENTION

Figure 1:
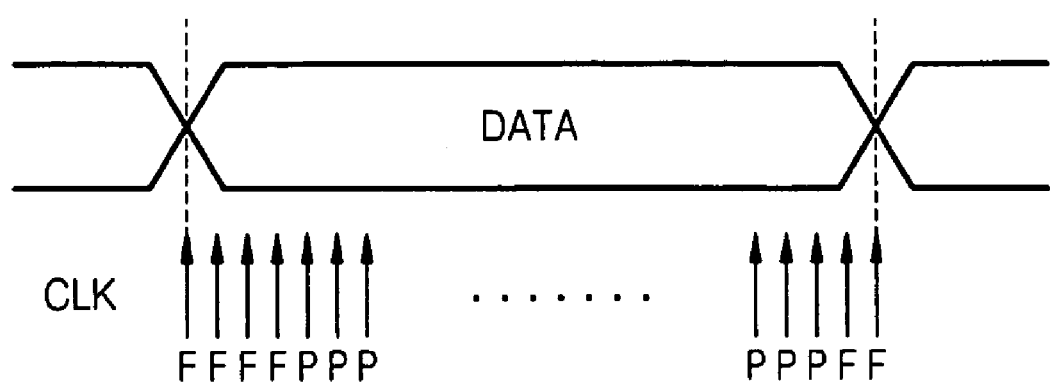
FIG. 1 illustrates data and a clock signal in a conventional clock phase shifting method.

Korean Patent Application No. 10-2007-0069837, filed on Jul. 11, 2007, in the Korean Intellectual Property Office, and entitled: "Method for Shifting Phase of Clock Signal and Memory Chip Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Throughout the drawings, like reference numerals refer to like elements.

Figure 2:
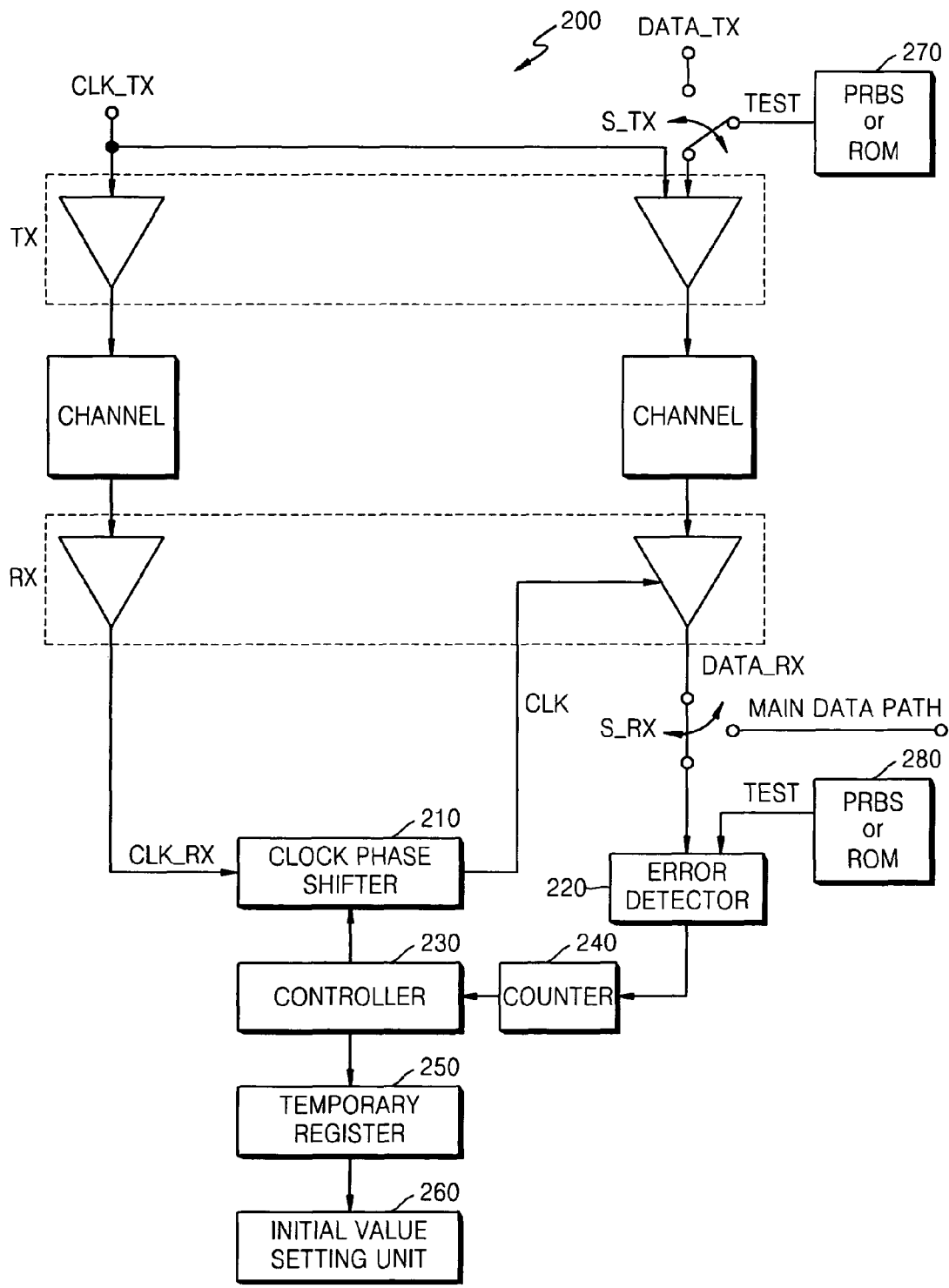
FIG. 2 illustrates a block diagram of a memory chip according to an embodiment of the present invention.

FIG. 2 illustrates a block diagram of a memory chip 200 according to an embodiment of the present invention. Referring to FIG. 2, the memory chip 200 may include a transmitter TX, a receiver RX, a clock phase shifter 210, an error detector 220, a controller 230, a counter 240, a temporary register 250, and an initial value setting unit 260. The memory chip 200 may include pseudo random bit sequence (PRBS) generators or read only memories (ROMs) 270 and 280 outputting test signal TEST having a plurality of random data bits.

The transmitter TX may transmit a clock signal CLK_TX and the test signal TEST to the receiver RX through channels. The test signal TEST may be transmitted in response to the clock signal CLK_TX. After a phase of the clock signal is shifted according to an embodiment, the transmitter TX may transmit the clock signal CLK_TX and data DATA_TX to the receiver RX through the channel. The data DATA_TX may be transmitted in response to the clock signal CLK_TX. A switch S_TX may connect the PRBS generator or ROM 270 to the transmitter TX while the phase of the clock signal is shifted, and may allow the data DATA_TX to be output to the receiver RX after the phase of the clock signal is shifted.

The receiver RX may receive data DATA_RX in response to an output signal CLK of the clock phase shifter 210. A switch S_RX may connect the receiver RX to the error detector 220 while the phase of the clock signal is shifted, and may connect the receiver RX to a predetermined path MAIN DATA PATH such that an output signal DATA_RX of the receiver RX is output through the path MAIN DATA PATH after the phase of the clock signal is shifted. The data DATA_TX, the data DATA_RX, and the test signal TEST may have a plurality of random data bits.

The clock phase shifter 210 may shift the phase of the clock signal CLK_RX received from the receiver RX to one of first through nth phases (n is a natural number). That is, the output signal CLK of the clock phase shifter 210 may be obtained by shifting only the phase of the clock signal CLK_RX. For example, when 1024-bit data is transmitted and received, the first through nth phases may have a phase difference of 10°. That is, the clock signal having the first phase may correspond to the received clock signal (CLK_RX=CLK), the clock signal having a second phase may be shifted by 10° from the clock signal CLK_RX, the clock signal having a third phase may be shifted by 20° from the clock signal CLK_RX, and so forth until the clock signal having a thirty-seventh (n=37) phase may be shifted by 360° from the clock signal CLK_RX. The clock signal having the first phase may be synchronized with left edges of the waveforms of the respective data bits, and the clock signal having the thirty-seventh phase may be synchronized with right edges of the waveforms of the respective data bits. The number of bits of data is not limited to 1024 and the phase difference is not limited to 10°.

The error detector 220 may determine whether the data bits sampled in synchronization with the clock signal CLK have an error. That is, the error detector 220 may compare the output signal DATA_RX sampled in synchronization with the clock signal CLK with a copy of the test signal TEST output from the PRBS generator or ROM 280.

The controller 230 may shift the phase of the clock signal CLK in response to the determination result of the error detector 220. Since the initial clock signal CLK has the first phase, the error detector 220 determines whether the first through 1024$^{th}$ data bits sampled in synchronization with the clock signal having the first phase have an error.

When a predetermined data bit has an error, the error detector 220 does not determine whether other data bits have an error. Rather, the controller 230 controls the clock phase shifter 210 to shift the phase of the clock signal CLK to the second phase. Then, the error detector 220 determines whether the first through 1024$^{th}$ data bits sampled in synchronization with the clock signal having the second phase have an error. In this case, the clock phase shifter 210 sequentially shifts the phase of the clock signal CLK from the first phase. The aforementioned operation is repeated until any one of the first through 1024$^{th}$ data bits does not have an error.

The counter 240 counts data bits that are sampled in synchronization with the clock signal having each of the first through nth phases and have no error. For example, if the first, second third and fourth data bits sampled in synchronization with the clock signal having the third phase have no error, the counter 240 stores '4'. If the fifth data bit sampled in synchronization with the clock signal having the third phase has an error, the controller 230 controls the clock phase shifter 210 to shift the phase of the clock signal CLK to the fourth phase and the counter 240 resets the previously stored count. Then, the counter 240 counts data bits that are sampled in synchronization with the clock signal having the fourth phase and have no error.

For example, when all of the first through 1024$^{th}$ data bits sampled in synchronization with the clock signal having the fourth phase have no error, the counter 240 stores a count '1024'. In this case, a first code corresponding to the fourth phase may be stored in the temporary register 250 and the controller 230 may control the clock phase shifter 210 to shift the phase of the clock signal CLK to the thirty-seventh phase.

When a predetermined data bit from among the first through 1024$^{th}$ data bits sampled in synchronization with the thirty-seventh phase initially has an error, it is not determined whether other data bits have an error. Rather, the controller 230 controls the clock phase shifter 210 to shift the phase of the clock signal CLK to the thirty-sixth phase. In this case, the clock phase shifter 210 may shift the phase of the clock signal CLK from the thirty-seventh phase to the first phase. The error detector 210 determines whether the first through 1024$^{th}$ data bits sampled in synchronization with the clock signal having the thirty-sixth phase have an error. The aforementioned operation is repeated until all of the first through 1024$^{th}$ data bits have no error.

For example, when the first through 1024$^{th}$ data bits sampled in synchronization with the clock signal having the thirty-fourth phase have no error, a second code corresponding to the thirty-fourth phase may be stored in the temporary register 250.

The initial value setting unit 260 may set an intermediate value of the first code and the second code as an initial sampling code value. That is, since the phase of the clock signal is decided in an initial operation of the memory chip 200, the clock signal having a shifted phase corresponding to the initial sampling code value may be used for normal data transmitting and receiving operations after the initial operation.

Figure 3:
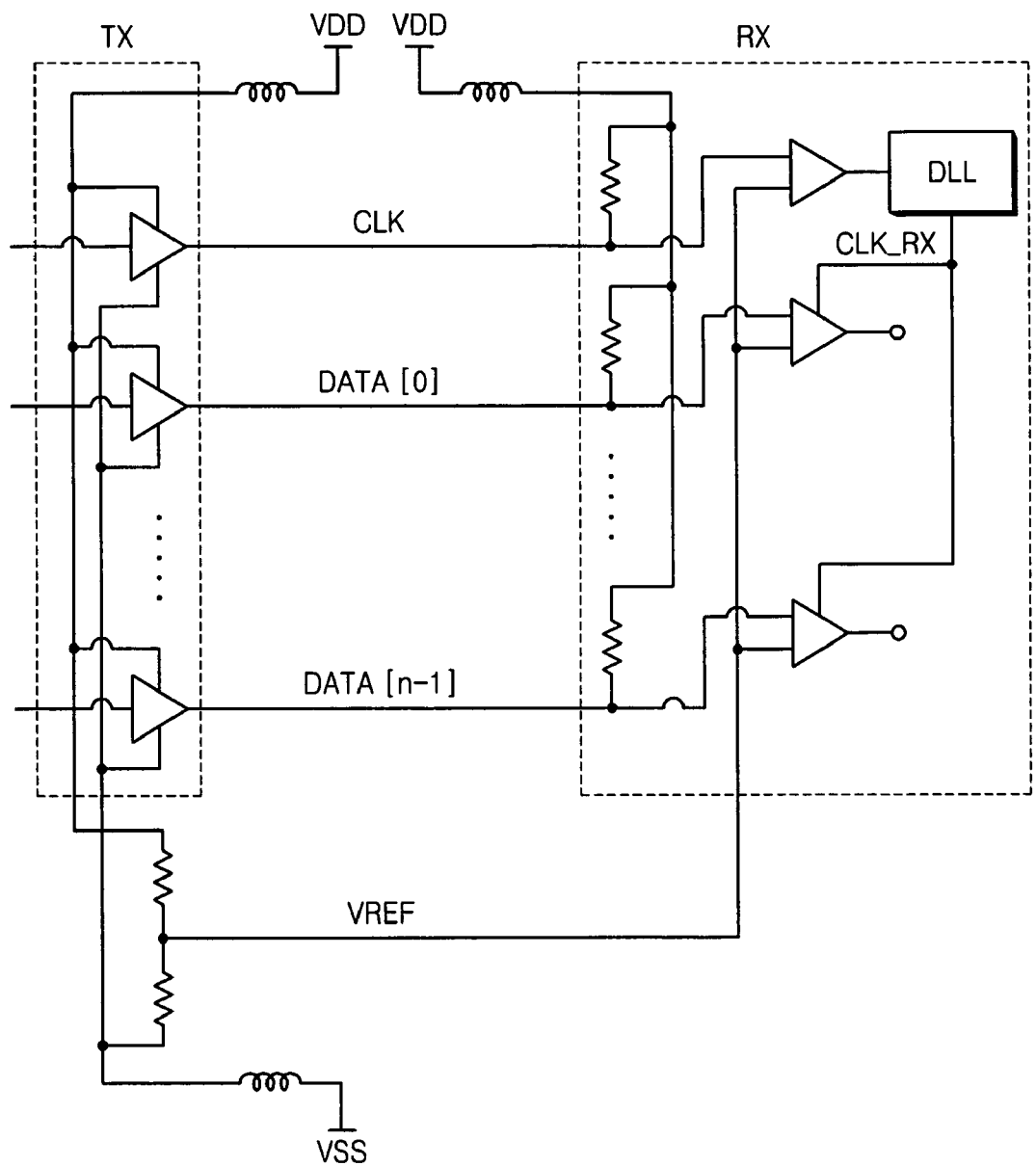
FIG. 3 illustrates a circuit diagram of a transmitter and a receiver illustrated in FIG. 2 according to an embodiment of the present invention.

FIG. 3 illustrates a circuit diagram of a transmitter TX' and a receiver RX' according to an embodiment of the present invention that may be used as the transmitter TX and the receiver RX illustrated in FIG. 2. The transmitter TX' may include a plurality of buffers connected in parallel, each buffer connected to a first voltage VSS through an inductor and to a second voltage VDD through an inductor. The transmitter TX' may receive data bits DATA[0] through DATA[n−1] and the clock signal CLK.

The receiver RX' may include a plurality of buffers connected in parallel, receiving the data bits DATA[0] through DATA[n−1] and the clock signal CLK from the transmitter TX'. Each buffer may be connected to the second voltage VDD through an inductor and a corresponding resistor, and connected to a reference voltage VREF from a resistance divided first and second voltages. Buffers receiving the data bits DATA[0] through DATA[n−1] may be connected to the clock signal CLK_RX through a delay-locked loop (DLL).

Referring to FIG. 3, the transmitter TX' may transmit data bits DATA[0] through DATA[n−1] and the clock signal CLK to the receiver RX. The receiver RX may receive the data bits DATA[0] through DATA[n−1] in response to the clock signal CLK_RX.

Figure 4:
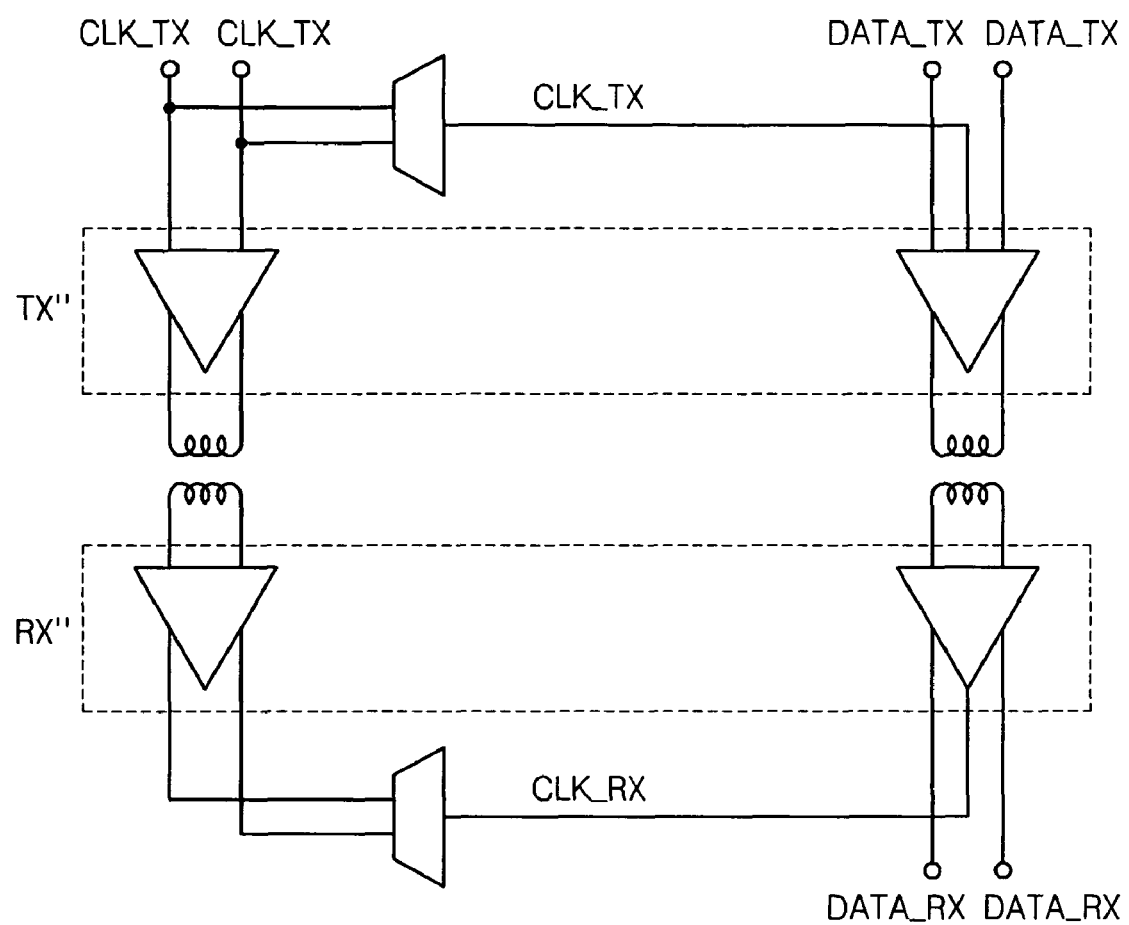
FIG. 4 illustrates a circuit diagram of the transmitter and the receiver illustrated in FIG. 2 according to another embodiment of the present invention.

FIG. 4 illustrates a circuit diagram of a transmitter TX" and a receiver RX" according to an embodiment of the present invention that may be used as the transmitter TX and the receiver RX illustrated in FIG. 2. The transmitter TX" may include a buffer receiving two clock signals CLK_TX, and a buffer receiving two data signals DATA_TX and a single clock signal CLK_TX from a multiplexer receiving the two clock signals CLK_TX, and outputting the two data signal DATA_TX.

The receiver RX" may include a buffer receiving two clock signals CLK_TX from the transmitter TX" and outputting two clock signals CLK_RX, a buffer receiving two data signals DATA_TX from the transmitter TX" and a single clock signal CLK_RX from a multiplexer receiving the two clock signals CLK_RX, and outputting two data signals DATA_RX.

Referring to FIG. 4, the transmitter TX" and the receiver RX" are inductively coupled to each other. The data DATA_TX and the clock signal CLK_TX may be transmitted from the transmitter TX" to the receiver RX". The transmitter TX" may transmit the data DATA_TX in response to the clock signal CLK_TX and the receiver RX" may receive the data DATA_RX in response to the received clock signal CLK_RX.

It will be understood by those of ordinary skill in the art that the transmitter TX and the receiver RX according to embodiments are not limited to the transmitters TX', TX" and the receivers RX', RX" illustrated in FIGS. 3 and 4.

Figure 5:
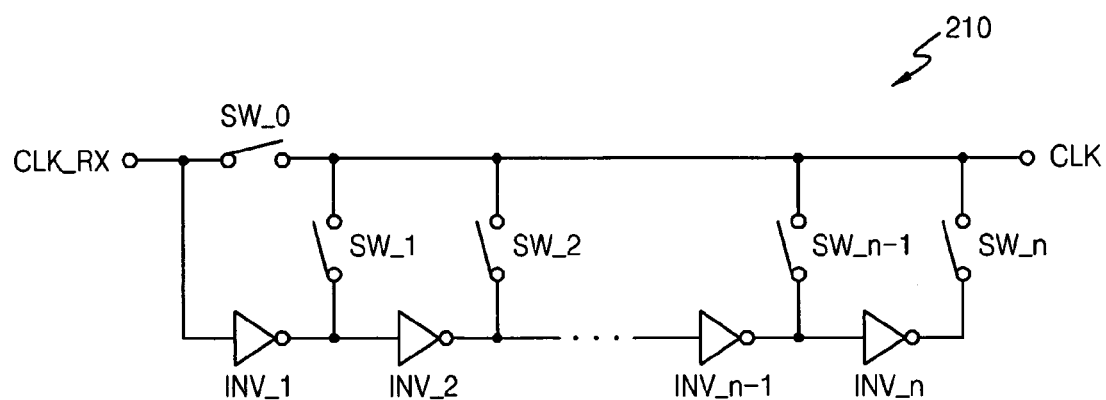
FIG. 5 illustrates a circuit diagram of a clock phase shifter illustrated in FIG. 2 according to an embodiment of the present invention.

FIG. 5 illustrates a circuit diagram of the clock phase shifter 210 illustrated in FIG. 2 according to an embodiment of the present invention. Referring to FIG. 5, the clock phase shifter 210 may be configured in the form of a simple inverter chain. That is, clock phase shifter 210 may include a plurality of inverters INV_1, INV2, . . . , INV_n−1, and INV_n for shifting the phase of the clock signal CLK_RX, and a plurality of switches SW_1, SW_2, . . . , SW_n−1, SW_n for determining whether the phase of the clock signal CLK_RX is shifted using the plurality of inverters INV_1, INV_2, . . . , INV_n−1, and INV_n. When the clock signal having the first phase is output, a switch SW_0 is closed and other switches SW_1, . . . , SW_n are opened. If the clock signal having the third phase is output, the switch SW_2 is closed and other switches SW_0, SW_1, SW_3, , , , SWn are opened. In this case, the phase of the clock signal CLK is retarded through the inverters INV_1 and INV_2, and the clock signal CLK having the third phase is output. For example, when the clock signal CLK having the nth phase, the switch SW_n is closed and other switches SW_0 through SW_n−1 are opened.

It will be understood by those of ordinary skill in the art that the clock phase shifter 210 is not limited to the circuit illustrated in FIG. 5 and any circuit that can freely change the phase of the input clock signal CLK_RX may be used as the clock phase shifter 210. For example, a phase interpolator may be used as the clock phase shifter 210.

Figure 6A:
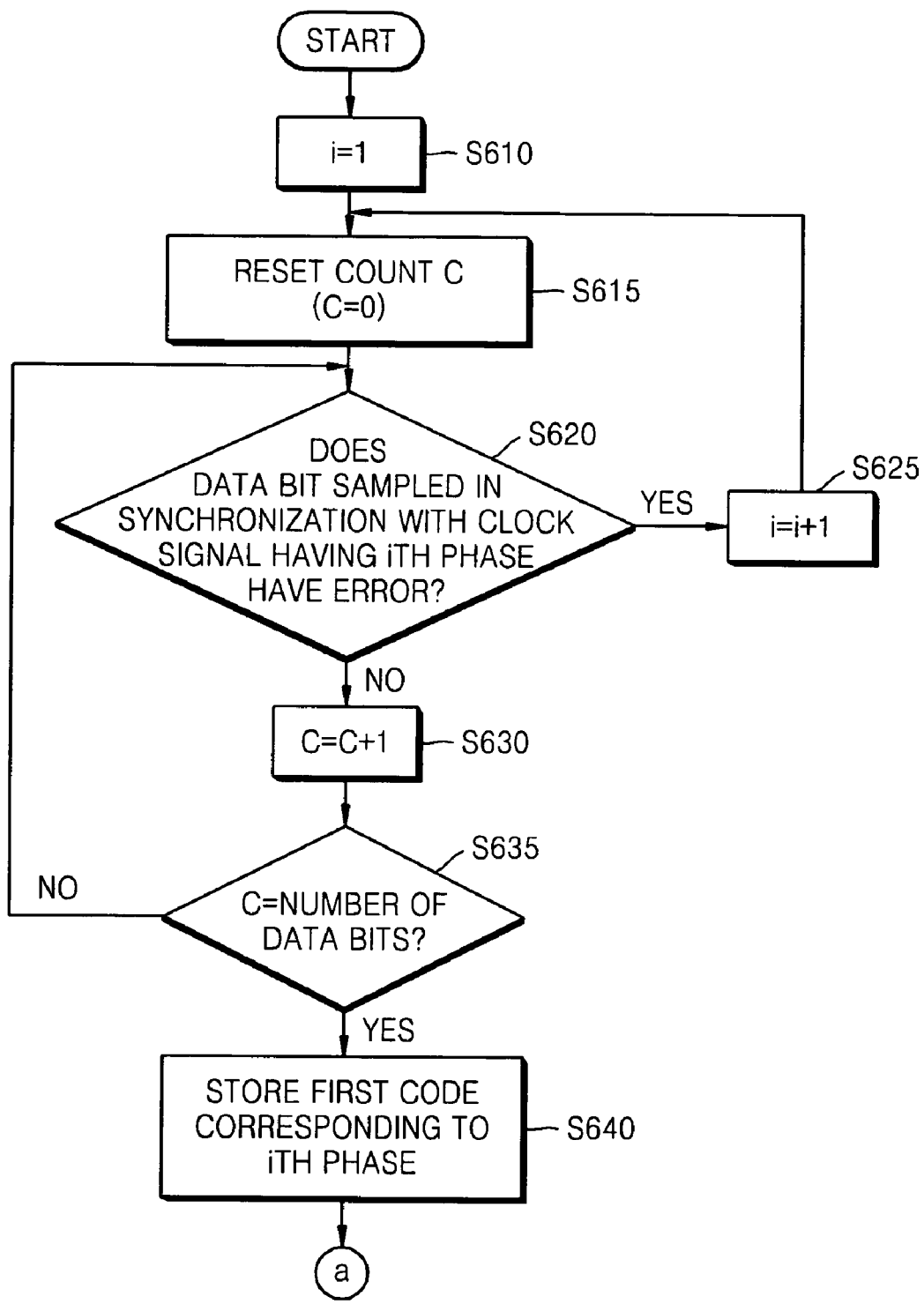
FIGS. 6A and 6B illustrate flow charts of a method for shifting the phase of a clock signal according to an embodiment of the present invention.
Figure 6B:
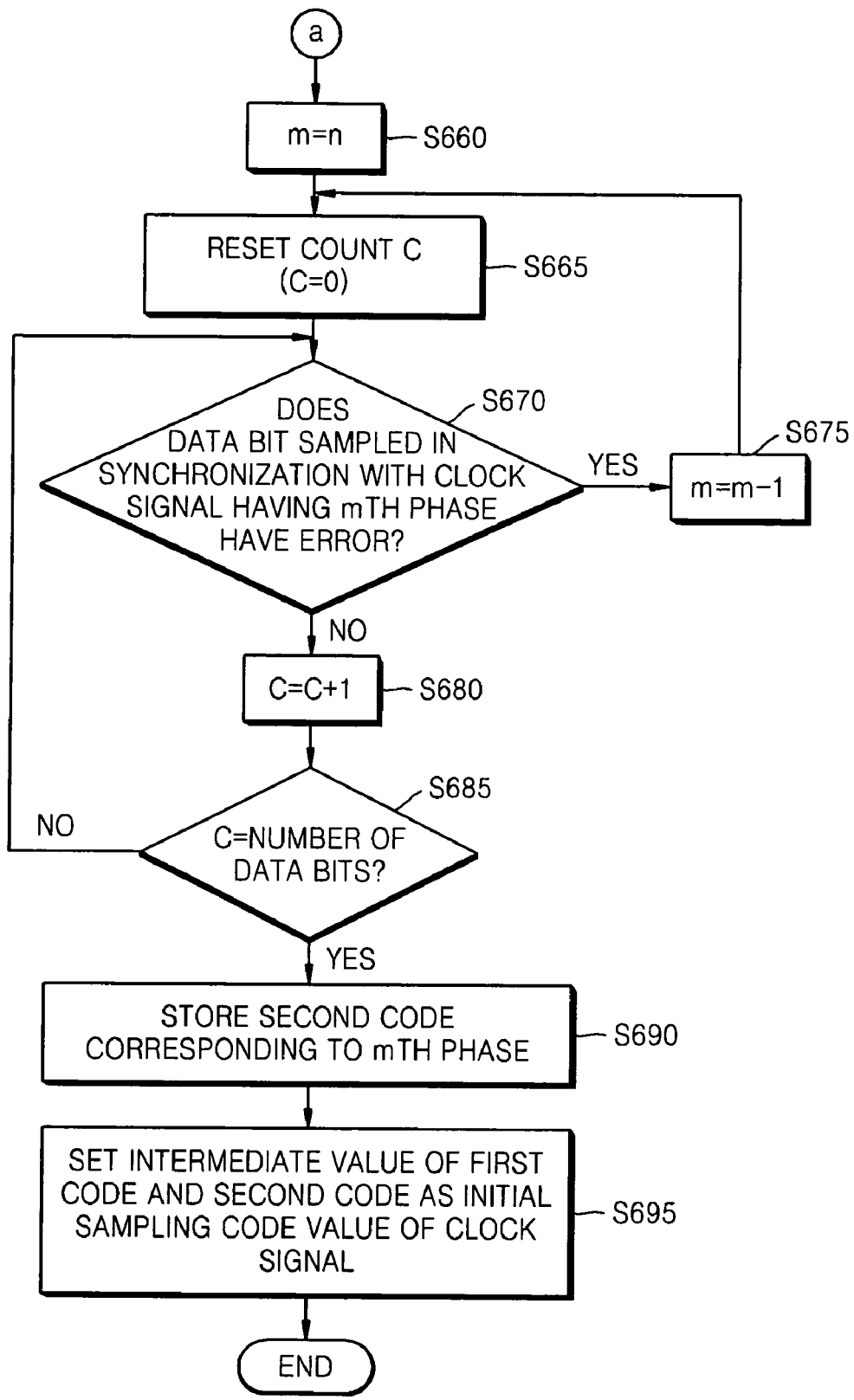
Figure 7A:
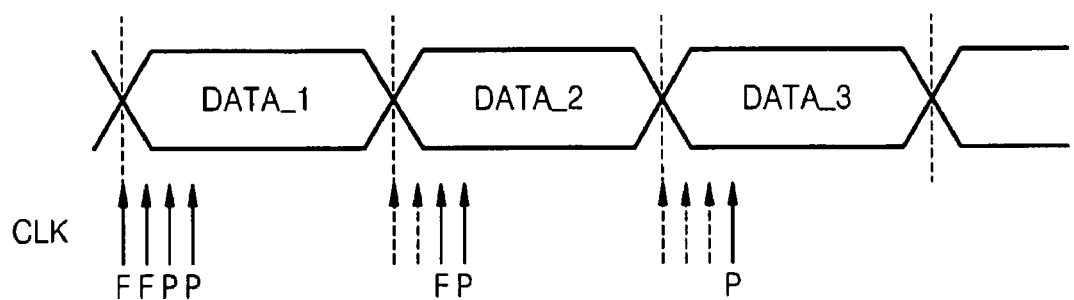
FIGS. 7A and 7B illustrate the relationship between a plurality of data bits and a clock signal according to an example for illustrating operation of an embodiment of the present invention.
Figure 7B:
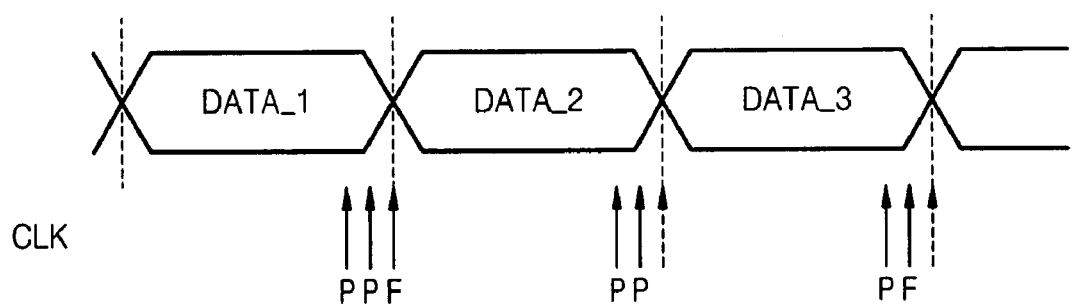

FIGS. 6A and 6B illustrate flow charts of a method for shifting the phase of a clock signal according to an embodiment of the present invention. FIGS. 7A and 7B illustrate the relationship between multiple data bits and a clock signal according to an example for illustrating operation of an embodiment of the present invention.

The operation of the memory chip 200 will now be explained with reference to FIGS. 2, 6A and 7A. In the current embodiment of the present invention, the first, second and third data bits DATA_1, DATA_2 and DATA_3 may be sampled in synchronization with the clock signal having the first through nth phases. The clock signal CLK having the first phase may be synchronized with the left edges of the waveforms of the first, second and third data bits DATA_1, DATA_2 and DATA3, and the clock signal CLK having the nth phase may be synchronized with the right edges of the waveforms of the first, second and third data bits DATA_1, DATA_2, and DATA3. However, according to another implementation, the clock signal CLK having the first phase may be synchronized with the right edges of the waveforms of the first, second and third data bits DATA_1, DATA_2, and DATA3, and the clock signal CLK having the nth clock may be synchronized with the left edges of the waveforms of the first, second, and third data bits DATA_1, DATA_2, and DATA3.

Operation 610 may set the first phase as the initial phase of the clock signal CLK. Operation S615 may reset the counter 240 to a count C to '0'. Operation S620 may determine whether the first data bit DATA_1 sampled in synchronization with the clock signal CLK having the first phase has an error. Referring to FIG. 7A, the first data bit DATA_1 sampled in synchronization with the clock signal CLK having the first phase has an error (F). Accordingly, in operation S625, the controller 230 may control the clock phase shifter 210 to shift the phase of the clock signal CLK to the second phase. In operation S615, the counter 240 may reset the count C (C=0) when the phase of the clock signal CLK is changed.

Subsequently, operation S620 may determine whether the first data bit DATA_1 sampled in synchronization with the clock signal CLK having the second phase has an error. Referring to FIG. 7A, the first data bit DATA_1 sampled in synchronization with the clock signal CLK having the second phase has an error (F). Accordingly, in operation S625, the controller 230 may control the clock phase shifter 210 to shift the phase of the clock signal CLK to the third phase. In operation S61, the counter 240 may reset the count C (C=0) when the phase of the clock signal CLK is changed.

Then, operation S620 may determine whether the first data bit DATA_1 sampled in synchronization with the clock signal CLK having the third phase has an error. Referring to FIG. 7A, the first data bit DATA_1 sampled in synchronization with the clock signal CLK having the third phase has no error (P). Accordingly, operation S630 may update the count C of the counter 240 by '1'. Operation S620 may determine whether the count C corresponds to the number of data bits. If not, as here C=1 and the number of data bits is 3, a next data bit, e.g., second data bit DATA_2, may be sampled in synchronization with the clock signal having the third phase. Referring to FIG. 7A, the second data bit DATA_2 sampled in synchronization with the clock signal CLK having the third phase has an error (F). Accordingly, operation S625 may have the controller 230 control the clock phase shifter 210 to shift the phase of the clock signal CLK to the fourth phase. In operation S615, the counter 240 may reset the count C (C=0) when the phase of the clock signal CLK is changed.

Operation S620 may determine whether the data bits DATA_1, DATA_2 and DATA3 sampled in synchronization with the clock signal CLK having the fourth phase have an error. Referring to FIG. 7A, the data bits DATA_1, DATA_2 and DATA3 sampled in synchronization with the clock signal CLK having the fourth phase have no error (P). In this case, operation S640 may store a first code corresponding to the fourth phase in the temporary register 250, since operation S635 determines that the count C corresponds to the number of data bits, e.g., '3'.

Generally, a first code may correspond to a kth phase (k is a natural number greater than 1 and less than n−1), and may be a first phase for which all data bits have no error. Once this first code has been stored, this portion of the method may cease. The method may then proceed to sample data starting from an opposite end of the signal, e.g., at the nth phase, as illustrated in FIG. 6B. Alternatively, both samplings may be performed simultaneously or the sampling and shifting may be conducted from the nth phase first and then from the first phase.

Additional operations of the memory chip 200 will now be explained with reference to FIGS. 2, 6B and 7B. Operation S660 may have the controller 230 control the clock phase shifter 210 to shift the phase of the clock signal CLK to the nth phase in operation S660. Operation S665 may have the counter 240 reset the count C (C=0).

Operation S670 may determine whether the first data bit DATA_1 sampled in synchronization with the clock signal CLK having the nth phase has an error. Referring to FIG. 7B, the first data bit DATA_1 sampled in synchronization with the clock signal CLK having the nth phase has an error (F). Accordingly, in operation S625, the controller 230 may control the clock phase shifter 210 to shift the phase of the clock signal CLK to the (n−1)th phase. In operation S665, the counter 240 may reset the count C (C=0) when the phase of the clock signal CLK is changed.

Subsequently, operation S670 may determine whether the first data bit DATA_1 sampled in synchronization with the clock signal CLK having the (n−1)th phase has an error. Referring to FIG. 7B, the first data bit DATA_1 sampled in synchronization with the clock signal CLK having the (n−1)th phase has no error (P). Accordingly, operation S680 may increase the count C of the counter by '1'. Operation S685 may determine whether the count C corresponds to the number of data bits. If not, operation S670 may sample a next data bit, e.g., the second data bit DATA_2, in synchronization with the clock signal having the (n−1)th phase. Referring to FIG. 7B, the second data bit DATA_2 sampled in synchronization with the clock signal CLK having the (n−1)th phase has no error (P). Operation S680 may increase the count C of the counter 240 by '1', i.e., the count C of the counter 240 becomes '2'. Operation S685 may determine whether the count C corresponds to the number of data bits. If not, operation S670 may sample a next data bit, e.g., the third data bit DATA_3, in synchronization with the clock signal having the (n−1)th phase. Referring to FIG. 7B, the third data bit DATA_3 sampled in synchronization with the clock signal having the (n−1)th phase has an error (F). Accordingly, in operation S675, the controller 230 may control the clock phase shifter 210 to shift the phase of the clock signal CLK to the (n−2)th phase. In operation S665, the counter 240 may reset the count C (C=0) when the phase of the clock signal CLK is changed.

In a like fashion, operations S670, S680 and S685 may be repeated to determine whether the data bits DATA_1, DATA_2, and DATA3 sampled in synchronization with the clock signal CLK having the (n−2)th phase have an error. Referring to FIG. 7B, the data bits DATA_1, DATA_2 and DATA3 sampled in synchronization with the clock signal CLK having the (n−2)th phase have no error (P). In this case, operation S690 may store a second code corresponding to the (n−2)th phase in the temporary register 250, since operation S685 determines that the count C corresponds to the number of data bits, e.g., '3'.

Generally, the second code may correspond to a jth phase (j is a natural number greater than k and less than n), and may be a last phase for which all data bits have no error. Once this second code has been stored, this portion of the method may cease. The method may then proceed to operation S695, in which the initial value setting unit 260 may set an intermediate value of the first code and the second code as an initial sampling code value of the clock signal CLK.

Figure 8:
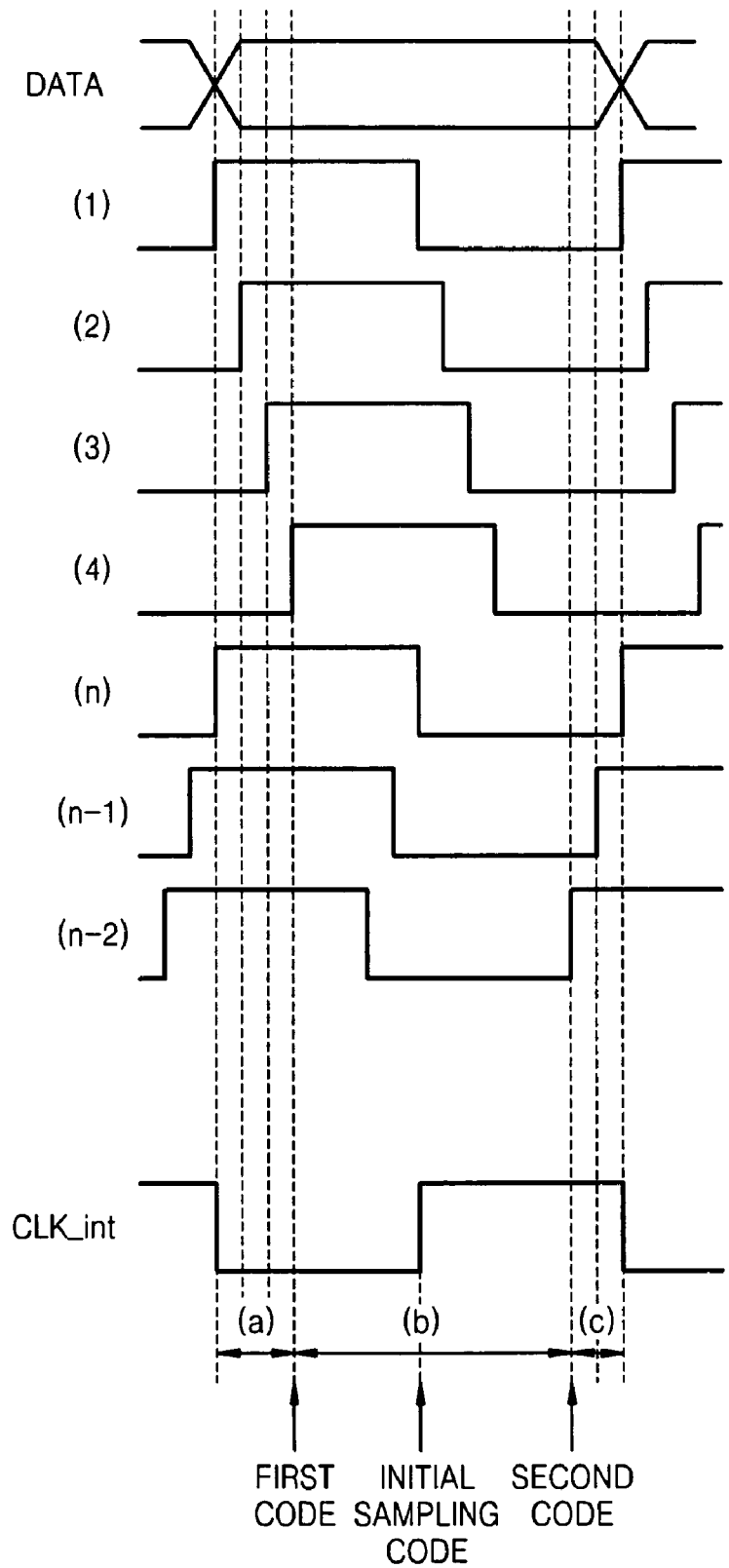
FIG. 8 illustrates a waveform diagram of the relationship between a single data bit and the clock signal in the method of shifting the phase of a clock signal according to an embodiment of the present invention.

FIG. 8 illustrates a waveform diagram of the relationship between a single data bit and the clock signal in the method of shifting the phase of a clock signal according to an embodiment of the present invention, using the example illustrated in FIGS. 7A and 7B. Referring to FIGS. 2 and 6A to 8, (1) represents the clock signal CLK having the first phase, (2) represents the clock signal CLK having the second phase, (3) represents the clock signal CLK having the third phase, (4) represents the clock signal CLK having the fourth phase, (n) represents the clock signal CLK having the nth phase, (n−1) represents the clock signal CLK having the (n−1)th phase, and (n−2) represents the clock signal CLK having the (n−2)th phase. A clock signal CLK_int denotes a clock signal having an intermediate phase that corresponds to the initial sampling code value when normal data transmission and receiving operations are performed.

In FIG. 8, the data bit DATA sampled has an error when the data bit DATA is sampled in synchronization with the clock signal in periods (a) and (c), as described with reference to FIGS. 7A and 7B. The data bit DATA is sampled without having an error in a period (b). Thus, the data bit DATA may be sampled in synchronization with the clock signal at a middle point of the period (b) in order to stably sample the data bit. Accordingly, the initial value setting unit 260 may set an intermediate value between the first code and the second code as the initial sampling code value of the clock signal. In an implementation, the clock signal CL_int may have a phase corresponding to a middle point between the end of the period (a) and the beginning of the period (c) during a normal operation of the memory chip.

The method of shifting the phase of a clock signal and the memory chip using the same according to embodiments do not determine whether each data bit sampled in synchronization with all the phases of the clock signal has an error. Furthermore, when one of the data bits initially has an error, embodiments do not determine whether remaining data bits have an error, but shift the phase of the clock signal and determine whether the data bits have an error for the next phase. Therefore, it is possible to rapidly set an intermediate point of a period in which all the data bits may be sampled without error in an initial operation of the memory chip.

In particular, according to embodiments, if an error exists in any of the data bits for a current clock phase, e.g., at the first occurrence of such an error for the current clock phase, the current clock phase is phase shifted, e.g., increased, to a next clock phase. Such error detection may continue from a first phase until an error free clock phase for all data bits is detected. Then, a first code may be stored corresponding to such a first error free clock phase k. Then, error detection may be performed by decreasing the phase starting from a last phase, e.g., an nth phase, until an error free clock phase for all data bits is detected. Then, a second code may be stored corresponding to such a second error free clock phase j. Thus, error detection need not be performed for clocks signals having phases between k and j, and once an error is detected for one data bit, subsequent data bits are not sampled. Rather, the method proceeds to sample a next phase.

Exemplary embodiments of the present invention have been disclosed herein, and although specific terms are employed, they are used and are to be interpreted in a generic and descriptive sense only and not for purpose of limitation. For example, while the search for the first code has been indicated as starting at the initial clock signal, this search may begin at phase shifted clock signals, and while the search for the second code has been indicated as starting at the nth clock signal, this search may begin at preceding phase shifted clock signals. Accordingly, it will be understood by those of ordinary skill in the art that various changes in form and details may be made without departing from the spirit and scope of the present invention as set forth in the following claims.

What is claimed is:

1. A memory chip, comprising:
a receiver configured to receive a test signal having a plurality of random data bits;
a clock phase shifter configured to shift a phase of a clock signal having a plurality of phases first through nth phases (n is a natural number);
an error detector configured to determine whether a data bit of the plurality of random data bits sampled in synchronization with the clock signal has an error;
a controller configured to control the clock phase shifter to sequentially increase the phase of the clock signal from the first phase when the error detector determines the data bit has an error;
a counter configured to count data bits when the error detector determines the data bit has no error,
wherein the controller is configured to control the clock phase shifter to sequentially decrease the phase of the clock signal from the nth phase when one of the plurality of random data bits sampled in synchronization with the clock signal having a kth phase (k is a natural number greater than 1 and smaller than n−1) have an error.

2. The memory chip as claimed in claim 1, wherein the controller is configured to control the clock phase shifter to shift the phase of the clock signal to an (i+1)th phase (i is a natural number greater than 1 and less than k−1) when an error is first generated in the plurality of data bits sampled in synchronization with the clock signal having an ith phase.

3. The memory chip as claimed in claim 1, wherein the controller is configured to control the clock phase shifter to shift the phase of the clock signal to an (m−1)th phase (m is a natural number greater than k+1 and smaller than n) when an error is first generated in the plurality of data bits sampled in synchronization with the clock signal having an mth phase.

4. The memory chip as claimed in claim 1, further comprising a temporary register configured to store a first code corresponding to the kth phase and to store a second code corresponding to a jth phase (j is a natural number greater than k and smaller than n) of the clock signal when none of the plurality of data bits sampled in synchronization with the clock signal having the jth phase have an error.

5. The memory chip as claimed in claim 4, further comprising an initial value setting unit configured to set an intermediate value of the first code and the second code as an initial sampling code value of the clock signal.

6. The memory chip as claimed in claim 1, wherein the controller is configured to determine that all of the plurality of data bits sampled in synchronization with the clock signal having the kth phase have no error when a count of the counter, obtained when the clock signal has the kth phase, is the number of the plurality of data bits.

7. The memory chip as claimed in claim 1, wherein the counter is configured to reset a count whenever the phase of the clock signal is shifted.

8. The memory chip as claimed in claim 1, wherein the clock phase shifter comprises:
   a plurality of inverters configured to shift the phase of the clock signal; and
   a plurality of switches configured to determine whether the phase of the clock signal is shifted using the inverters.

9. The memory chip as claimed in claim 1, wherein the clock signal having the first phase is synchronized with the left edge of the waveform of each data bit, and the clock signal having the nth phase is synchronized with the right edge of the waveform of each data bit.

10. A memory chip, comprising:
    a receiver configured to receive a test signal having a plurality of random data bits;
    a clock phase shifter configured to shift the phase of a clock signal to one of first through nth phases (n is a natural number);
    an error detector configured to determine whether a data bit sampled in synchronization with the clock signal has an error; and
    a controller configured to control the clock phase shifter to sequentially decrease the phase of the clock signal from the nth phase when the error detector determines the data bit has an error;
    a counter configured to count data bits when the error detector determines the data bit has no error,
    wherein the controller is configured to control the clock phase shifter to sequentially increase the phase of the clock signal from the first phase when one of the plurality of random data bits sampled in synchronization with the clock signal having a jth phase (j is a natural number greater than 2 and less than n) have an error.

11. The memory chip as claimed in claim 10, wherein the controller is configured to control the clock phase shifter to decrease the phase of the clock signal to an (m−1)th phase (m is a natural number greater than j+1 and smaller than n) when an error is initially generated in the data bits sampled in synchronization with the clock signal having an mth phase.

12. The memory chip as claimed in claim 10, wherein the controller is configured to control the clock phase shifter to increase the phase of the clock signal to an (i+1)th phase (i is a natural number greater than 1 and less than j−1) when an error is initially generated in the data bits sampled in synchronization with the clock signal having an ith phase.

13. The memory chip as claimed in claim 10, wherein the clock signal having the first phase is synchronized with the left edge of the waveform of each data bit, and the clock signal having the nth phase is synchronized with the right edge of the waveform of each data bit.

14. A method for shifting the phase of a clock signal to prevent an error in a memory chip, the method for preventing an error comprising:
    determining whether a data bit of a plurality of data bits sampled in synchronization with a clock signal having a plurality of phases sequentially shifted from a first phase to an nth phase (n is a natural number) has an error;
    increasing the phase of the clock signal to an (i+1)th phase (i is a natural number greater than 1 and smaller than n−1) and determining whether the data bit has an error;
    shifting the phase of the clock signal to the nth phase when none of the plurality of data bits sampled in synchronization with the clock signal having the ith phase have an error;
    determining whether the data bit sampled in synchronization with the clock signal sequentially shifted from the nth phase has an error; and
    decreasing the phase of the clock signal to an (m−1)th phase (m is a natural number greater than 2 and smaller than n) when the data bit has an error.

15. The method as claimed in claim 14, further comprising:
    storing a first code corresponding to the ith phase when none of the plurality of the data bits sampled in synchronization with the clock signal having the ith phase have an error; and
    storing a second code corresponding to the mth phase when none of the plurality of data bits sampled in synchronization with the clock signal having the mth phase have an error.

16. The method as claimed in claim 14, further comprising setting the intermediate value of the first code and the second code as an initial sampling code value of the clock signal.

17. The method as claimed in claim 14, wherein the shifting of the phase of the clock signal to the nth phase comprises:
    counting a data bit that is sampled in synchronization with the clock signal having the ith phase and has no error; and
    determining that the data bits sampled in synchronization with the clock signal having the ith phase have no error when the count corresponds to the number of the plurality of data bits.

18. The method as claimed in claim 17, wherein counting of a data bit comprises resetting a count whenever the phase of the clock signal is shifted.

19. The method as claimed in claim 14, wherein the clock signal having the first phase is synchronized with the left edge of the waveform of each data bit, and the clock signal having the nth phase is synchronized with the right edge of the waveform of each data bit.

* * * * *